(12) United States Patent
Boche et al.

(10) Patent No.: US 12,545,431 B2
(45) Date of Patent: Feb. 10, 2026

(54) HEALTH MONITORING SYSTEM

(71) Applicant: Ratier-Figeac SAS, Figeac (FR)

(72) Inventors: Adele Boche, Albiac (FR); Romain Bouloc, Saint Felix (FR)

(73) Assignee: RATIER-FIGEAC SAS, Figeac (FR)

( * ) Notice: Subject to any disclaimer, the term of this patent is extended or adjusted under 35 U.S.C. 154(b) by 14 days.

(21) Appl. No.: 18/796,744

(22) Filed: Aug. 7, 2024

(65) Prior Publication Data

US 2025/0051032 A1 Feb. 13, 2025

(30) Foreign Application Priority Data

Aug. 9, 2023 (EP) .................................. 23306355

(51) Int. Cl.
*B64C 11/44* (2006.01)
*B64C 11/30* (2006.01)
*B64D 45/00* (2006.01)

(52) U.S. Cl.
CPC ........ *B64D 45/0005* (2013.01); *B64C 11/301* (2013.01); *B64D 2045/0085* (2013.01)

(58) Field of Classification Search
CPC ..... B64C 11/303; B64C 11/301; B64C 11/44; B64D 45/00
See application file for complete search history.

(56) References Cited

U.S. PATENT DOCUMENTS 5,779,446 A * 7/1998 Althof ...................... F01D 7/00
416/49
5,997,250 A 12/1999 Carter, Jr. et al.
8,794,920 B2 8/2014 Bacic et al.
10,717,545 B2 * 7/2020 El Haloui ............ G07C 5/0816
2015/0314853 A1 11/2015 Tantot et al.
2018/0079522 A1 3/2018 El Haloui
2021/0009252 A1 1/2021 Forte et al.
2021/0180525 A1 6/2021 Meunier (Continued)

FOREIGN PATENT DOCUMENTS

CN 112758315 A 5/2021
CN 119018383 A * 11/2024 ............ B64C 11/44

(Continued)

OTHER PUBLICATIONS

Abstract for CN112758315 (A), Published: May 7, 2021, 1 page.

(Continued)

*Primary Examiner* — Brian M O'Hara

(74) *Attorney, Agent, or Firm* — CANTOR COLBURN LLP

(57) ABSTRACT

A method of performing health monitoring for an aircraft having a variable pitch propeller system. The method includes: receiving aircraft flight information; performing a virtual pitch calculation to determine a virtual propeller pitch or virtual blade angle from the aircraft flight information; receiving a measured propeller pitch or blade angle from at least one physical sensor associated with the propeller; and using the virtual propeller pitch or virtual blade angle and the measured propeller pitch or blade angle to perform a health monitoring process to determine a health condition of at least one component of the aircraft, wherein the at least one component is distinct from the blades.

16 Claims, 5 Drawing Sheets

(56) References Cited

U.S. PATENT DOCUMENTS

2022/0243610 A1    8/2022   Krzywon

FOREIGN PATENT DOCUMENTS

EP         3543112 A1 *  9/2019  ........... B64C 11/305
WO      2023099835 A1     6/2023

OTHER PUBLICATIONS

European Search Report for Application No. 23306355.1, mailed Dec. 14, 2023, 5 pages.
McCormick B.W. "Aerodynamics of V/STOL Aircraft" AD688921, AGARD Advisory Group for Aerospace Research and Development, May 1968, 498 pages (Broken Into Four Parts).
Baskin V. E., et al. "Theory of the lifting airscrew" (1973), National Aeronautics and Space Administration, NASA Technical Translation, NASA TT F-823, 481 pages (broken up into three parts).
Goldstein S. "On the Vortex Theory of Screw Propellers." (1929), pp. 440-465, retrieved from https://royalsocietypublishing.org/ on Sep. 4, 2025.
Ladden and Gilmore, "Advanced V/STOL Propeller Technology" vol. II, "Static Thrust Prediction Method Development", AFFDL-TR-71-88, vol. II, Sep. 1971, 12 pages.
Locke et al. "Tables for Use in an Improved Method of Airscrew Strip Theory Calculation" Reports and Memoranda No. 1674, Oct. 22, 1934, 42 pages.

* cited by examiner

HEALTH MONITORING SYSTEM

CROSS-REFERENCE TO RELATED APPLICATIONS

This application claims the benefit of European Patent Application No. 23306355.1 filed Aug. 9, 2023, the disclosure of which is incorporated herein by reference in its entirety.

FIELD OF THE INVENTION

This application relates to pitch protection systems, pitch control systems, health monitoring systems, variable pitch propeller systems, aircraft and methods.

BACKGROUND

It is important to monitor the health of an aircraft and its systems to reduce the likelihood of components failing during flight. However, it can be difficult to obtain data to enable health monitoring to be reliably performed.

SUMMARY

According to a first aspect, there is provided a method of performing health monitoring for an aircraft having a variable pitch propeller system, the method comprising: receiving aircraft flight information; performing a virtual pitch calculation to determine a virtual propeller pitch or virtual blade angle from the aircraft flight information; receiving a measured propeller pitch or blade angle from at least one physical sensor associated with the propeller; and using the virtual propeller pitch or virtual blade angle and the measured propeller pitch or blade angle to perform a health monitoring process to determine a health condition of at least one component of the aircraft, wherein the at least one component is distinct from the blades.

By performing the virtual pitch calculation to determine the virtual propeller pitch or virtual blade angle, a useful source of data for aircraft health monitoring may be provided e.g. with a discrepancy between a measured value and a virtual value to indicate that components of the aircraft are not operating as would be expected.

The determining the health condition may comprise propeller gearbox failure detection and/or propeller pitch change actuator failure detection.

The health monitoring process may be performed during flight. The health monitoring process may be performed when the aircraft is on the ground.

The health monitoring process may comprise comparing the virtual propeller pitch or virtual blade angle to a measured propeller pitch or blade angle. A poor health condition may be determined where a discrepancy between a virtual value and a measured value exceeds a threshold.

The measured propeller pitch may be determined using measured blade angle and propeller speed. The method may comprise measuring the blade angle and propeller speed.

The health monitoring process may comprise determining a failure of the component. The health monitoring process may comprise determining a wear condition of the component.

The component of the aircraft may be an aircraft system. The aircraft system may comprise a mechanical system of the propeller. The aircraft system may comprise a hydraulic system of the propeller. The aircraft system may comprise an electrical system of the propeller. The aircraft system may comprise a propeller gearbox.

The aircraft flight information may comprise air information. The virtual pitch calculation may comprise an air information computation performed on the air information to determine the virtual propeller pitch or virtual blade angle.

The method may comprise sensing the air information.

The air information may comprise aircraft speed information. The aircraft speed information may comprise indicated airspeed. The aircraft speed information may comprise Mach number. The aircraft speed information may comprise true airspeed.

The air information may comprise ambient information. The ambient information may comprise aircraft altitude. The ambient information may comprise ambient air density. The ambient information may comprise ambient temperature.

The air information may comprise any additional information like pitch, yaw and roll angles, angel of attack, X, Y or Z accelerations, weight, etc. . . .

The aircraft flight information may comprise propeller driving power information.

The propeller driving power information may comprise engine parameters. The engine parameters may comprise engine torque. The engine parameters may comprise engine rotational speed. The engine parameters may comprise engine power.

The propeller driving power information may comprise propeller parameters. The propeller parameters may comprise propeller rotational speed. The propeller parameters may comprise propeller driving torque. The propeller parameters may comprise propeller driving power.

The virtual pitch calculation may comprise a propeller power computation performed on the propeller driving power information to determine the virtual propeller pitch or virtual blade angle.

The input shaft propeller power may be computed with the propeller rotational speed and the absorbed propeller torque. The input shaft propeller power may be computed with the aircraft airspeed, the propeller thrust and the propeller efficiency. The input shaft propeller power may be computed with the engine rotational speed and the engine torque. The computation with the propeller rotational speed and the absorbed propeller torque is preferred.

The aircraft flight information may comprise aircraft system configuration information. The aircraft system configuration information may comprise a configuration of an aircraft flight control component. The aircraft control component may comprise a flap. The aircraft control component may comprise a slat. The aircraft system configuration information may comprise a landing gear status.

The method may comprise sensing the propeller driving power information from an engine of the aircraft, the engine configured to drive the propeller.

The aircraft flight information may exclude measured propeller pitch. The aircraft flight information may exclude measured blade angle. The aircraft flight information may exclude propeller rotational speed.

The virtual pitch calculation comprises performing an aircraft flight information verification process to verify that the aircraft flight information is valid. The aircraft flight information verification process may comprise determining that a sensor is operational. The aircraft flight information verification process may comprise determining that a sensor is within operational range. The aircraft flight information verification process may comprise determining that a sensor is connected.

According to a second aspect, there is provided a health monitoring system for a variable pitch propeller system of an aircraft, the health monitoring system comprising: a virtual pitch sensor configured to receive aircraft flight information and perform a virtual pitch calculation to determine a virtual propeller pitch or virtual blade angle from the aircraft flight information; at least one physical sensor configured to measure propeller pitch or blade angle; and a health monitoring processor configured to use the virtual propeller pitch or virtual blade angle and the measure propeller pitch or blade angle to perform a health monitoring process to determine a health condition of at least one component of the aircraft, wherein the at least one component is distinct from the blades.

The determining the health condition may comprise propeller gearbox failure detection and/or propeller pitch change actuator failure detection.

The aircraft flight information may comprise air information. The virtual pitch calculation may comprise an air information computation performed on the air information to determine the virtual propeller pitch or virtual blade angle.

The health monitoring system may comprise an ambient sensing arrangement configured to sense the air information.

The air information may comprise aircraft speed information. The aircraft speed information may comprise indicated airspeed. The aircraft speed information may comprise Mach number. The aircraft speed information may comprise true airspeed.

The air information may comprise ambient information. The ambient information may relate to ambient conditions. The ambient information may comprise aircraft altitude. The ambient information may comprise ambient air density. The ambient information may comprise ambient air temperature.

The aircraft flight information may comprise propeller driving power information.

The propeller driving power information may comprise engine parameters. The engine parameters may comprise engine output torque. The engine parameters may comprise engine rotational speed. The engine parameters may comprise engine output mechanical power.

The propeller driving power information may comprise propeller parameters. The propeller parameters may comprise propeller rotational speed. The propeller parameters may comprise propeller driving torque. The propeller parameters may comprise propeller driving power.

The virtual pitch calculation may comprise a propeller power computation performed on the propeller driving power information to determine the virtual propeller pitch or virtual blade angle.

The input shaft propeller power may be computed with the propeller rotational speed and the absorbed propeller torque. The input shaft propeller power may be computed with the aircraft airspeed, the propeller thrust and the propeller efficiency. The input shaft propeller power may be computed with the engine rotational speed and the engine torque. The computation with the propeller rotational speed and the absorbed propeller torque is preferred.

The aircraft flight information may comprise aircraft system configuration information. The aircraft system configuration information may comprise a configuration of an aircraft flight control component. The aircraft control component may comprise a flap. The aircraft control component may comprise a slat. The aircraft system configuration information may comprise a landing gear status.

The health monitoring system may comprise a propeller power sensor configured to sense the propeller driving power information. The power sensor may be configured to sense the propeller driving power information from an engine of the aircraft, the engine configured to drive the propeller.

The aircraft flight information may exclude measured propeller pitch. The aircraft flight information may exclude measured blade angle. The aircraft flight information may exclude propeller rotational speed.

The virtual pitch calculation comprises performing an aircraft flight information verification process to verify that the aircraft flight information is valid. The aircraft flight information verification process may comprise determining that a sensor is operational. The aircraft flight information verification process may comprise determining that a sensor is within operational range.

According to a third aspect, there is provided a variable pitch propeller system comprising the health monitoring system described above.

According to a fourth aspect, there is provided an aircraft comprising the variable pitch propeller system.

The method of the first aspect may comprise any of the features and/or functional steps described with respect to the second, third and/or fourth aspects. The health monitoring system of the second aspect may comprise any of the features and/or functional steps described with respect to the first, third and/or fourth aspects. The variable pitch propeller system of the third aspect may comprise any of the features and/or functional steps described with respect to the first, second, and/or fourth aspects. The aircraft of the fourth aspect may comprise any of the features and/or functional steps described with respect to the first, second, and/or third aspects.

According to a fifth aspect, there is provided a method of operating a variable pitch propeller system for an aircraft, the method comprising: receiving aircraft flight information; performing a virtual pitch calculation to determine a virtual propeller pitch or virtual blade angle from the aircraft flight information; and performing a pitch protection process in response to low virtual propeller pitch or virtual blade angle being determined.

The aircraft flight information may comprise air information. The virtual pitch calculation may comprise an air information computation performed on the air information to determine the virtual propeller pitch or virtual blade angle.

The method may comprise sensing the air information.

The air information may comprise aircraft speed information. The aircraft speed information may comprise indicated airspeed. The aircraft speed information may comprise Mach number. The aircraft speed information may comprise true airspeed.

The air information may comprise ambient information. The ambient information may comprise aircraft altitude. The ambient information may comprise ambient air density. The ambient information may comprise ambient temperature.

The aircraft flight information may comprise propeller driving power information.

The air information may comprise any additional information such as aircraft pitch, yaw and roll angles, angle of attack, X, Y or Z accelerations, weight.

The propeller driving power information may comprise engine parameters. The engine parameters may comprise engine torque. The engine parameters may comprise engine rotational speed. The engine parameters may comprise engine power.

The propeller driving power information may comprise propeller parameters. The propeller parameters may comprise propeller rotational speed. The propeller parameters may comprise propeller torque. The propeller parameters may comprise propeller power.

The virtual pitch calculation may comprise a propeller power computation performed on the propeller driving power information.

The aircraft flight information may comprise aircraft system configuration information. The aircraft system configuration information may comprise a configuration of an aircraft flight control component. The aircraft control component may comprise a flap. The aircraft control component may comprise a slat. The aircraft system configuration information may comprise a landing gear status.

The method may comprise sensing the propeller driving power information from an engine of the aircraft, the engine configured to drive the propeller.

The aircraft flight information may exclude measured propeller pitch. The aircraft flight information may exclude measured blade angle. The aircraft flight information may exclude propeller rotational speed.

The pitch protection process may comprise controlling the variable pitch propeller system to increase the propeller pitch and/or blade angle.

The pitch protection process may comprise bypassing a pitch controller of the variable pitch propeller system.

The virtual pitch calculation comprises performing an aircraft flight information verification process to verify that the aircraft flight information is valid. The aircraft flight information verification process may comprise determining that a sensor is operational. The aircraft flight information verification process may comprise determining that a sensor is within operational range. The aircraft flight information verification process may comprise determining that a sensor is connected.

The method may comprise, in response to low virtual propeller pitch or virtual blade angle not being determined, controlling the propeller pitch according to a pitch control process. The pitch control process may comprise receiving measured blade angle from a blade angle sensor and controlling a pitch of the propeller in response to the measured blade angle.

The method may comprise sensing the blade angle from the propeller.

The pitch control process may comprise linear control. The pitch control process may comprise a proportional control. The pitch control process may comprise integral control. The pitch control process may comprise derivative control. The pitch control process may comprise any of proportional control and/or integral control and/or derivative control and any combination thereof. The pitch control process may comprise non-linear control. The pitch control process may comprise deterministic control. The pitch control process may comprise lead-lag control. Other types of control may be foreseen.

According to a sixth aspect, there is provided a protection system for a variable pitch propeller system, the protection system comprising: a virtual pitch sensor configured to receive aircraft flight information and perform a virtual pitch calculation to determine a virtual propeller pitch or virtual blade angle from the aircraft flight information; and a processor configured to perform a pitch protection process in response to low virtual propeller pitch or virtual blade angle being determined.

Low virtual propeller pitch or virtual blade angle may be determined when the virtual propeller pitch is below a propeller pitch threshold. Low virtual propeller pitch or virtual blade angle may be determined when the virtual blade angle is below a threshold.

The aircraft flight information may comprise air information. The virtual pitch calculation may comprise an air information computation performed on the air information to determine the virtual propeller pitch or virtual blade angle.

The protection system may comprise an ambient sensing arrangement configured to sense the air information.

The air information may comprise aircraft speed information. The aircraft speed information may comprise indicated airspeed. The aircraft speed information may comprise Mach number. The aircraft speed information may comprise true airspeed.

The air information may comprise ambient information. The ambient information may relate to ambient conditions. The ambient information may comprise aircraft altitude. The ambient information may comprise ambient air density. The ambient information may comprise ambient temperature.

The air information may comprise any additional information such as aircraft pitch, yaw and roll angles, angle of attack, X, Y or Z accelerations, weight.

The aircraft flight information may comprise propeller driving power information.

The propeller driving power information may comprise engine parameters. The engine parameters may comprise engine torque. The engine parameters may comprise engine rotational speed. The engine parameters may comprise engine power.

The propeller driving power information may comprise propeller parameters. The propeller parameters may comprise propeller rotational speed. The propeller parameters may comprise propeller thrust.

The virtual pitch calculation may comprise a propeller power computation performed on the propeller driving power information to determine the virtual propeller pitch or virtual blade angle.

The protection system may comprise a propeller power sensor configured to sense the propeller driving power information. The power sensor may be configured to sense the propeller driving power information from an engine of the aircraft, the engine configured to drive the propeller.

The aircraft flight information may exclude measured propeller pitch. The aircraft flight information may exclude measured blade angle. The aircraft flight information may exclude propeller rotational speed.

The pitch protection process may comprise controlling the variable pitch propeller system to increase the propeller pitch and/or blade angle.

The pitch protection process may comprise bypassing a pitch controller of the variable pitch propeller system.

The virtual pitch calculation may comprise performing an aircraft flight information verification process to verify that the aircraft flight information is valid. The aircraft flight information verification process may comprise determining that a sensor is operational. The aircraft flight information verification process may comprise determining that a sensor is within range.

The protection system may be comprised in a protection unit. The virtual pitch sensor and the protection processor may be embodied in a single processor. The virtual pitch sensor and the protection processor may be in separate units.

According to a seventh aspect, there is provided a variable pitch propeller system comprising the protection system described above.

The variable pitch propeller system may comprise a pitch controller configured, in response to low virtual propeller pitch or virtual blade angle not being determined, to control the propeller pitch according to a pitch control process. The pitch control process may comprise receiving measured blade angle from a blade angle sensor and controlling a pitch of the propeller in response to the measured blade angle.

The variable pitch propeller system may comprise a blade angle sensor configured to measure the blade angle from the propeller.

The pitch control process may comprise linear control. The pitch control process may comprise a proportional control. The pitch control process may comprise integral control. The pitch control process may comprise derivative control. The pitch control process may comprise any of proportional control and/or integral control and/or derivative control.

The variable pitch propeller system may comprise the propeller. The variable pitch propeller system may comprise a drive unit for driving the propeller.

According to an eighth aspect, there is provided an aircraft comprising the variable pitch propeller system.

The method of the fifth aspect may comprise any of the features and/or functional steps described with respect to sixth, seventh and/or eighth aspects. The protection system of the sixth aspect may comprise any of the features and/or functional steps described with respect to the fifth, seventh and/or eighth aspects. The variable pitch propeller system of the seventh aspect may comprise any of the features and/or functional steps described with respect to the fifth, sixth and/or eighth aspects. The aircraft of the eighth aspect may comprise any of the features and/or functional steps described with respect to the fifth, sixth and/or seventh aspects.

The systems and methods relating to health monitoring in the first to fourth aspects may comprise any of the features and/or functional steps specified in relation to the systems and methods relating to protection in the fifth to eighth aspects. Additionally, the systems and methods relating to protection in the fifth to eighth aspects may comprise any of the features and/or functional steps specified in relation to the systems and methods relating to health monitoring in the first to fourth aspects.

The protection system and the health monitoring system may share a common virtual pitch sensor. The protection system and the health monitoring system may each comprise an independent virtual pitch sensor. The variable pitch propeller system and/or the aircraft may comprise the protection system and the health monitoring system.

BRIEF DESCRIPTION OF THE DRAWINGS

Various examples will now be described with reference to the accompanying drawings in which.

DETAILED DESCRIPTION

Figure 1:
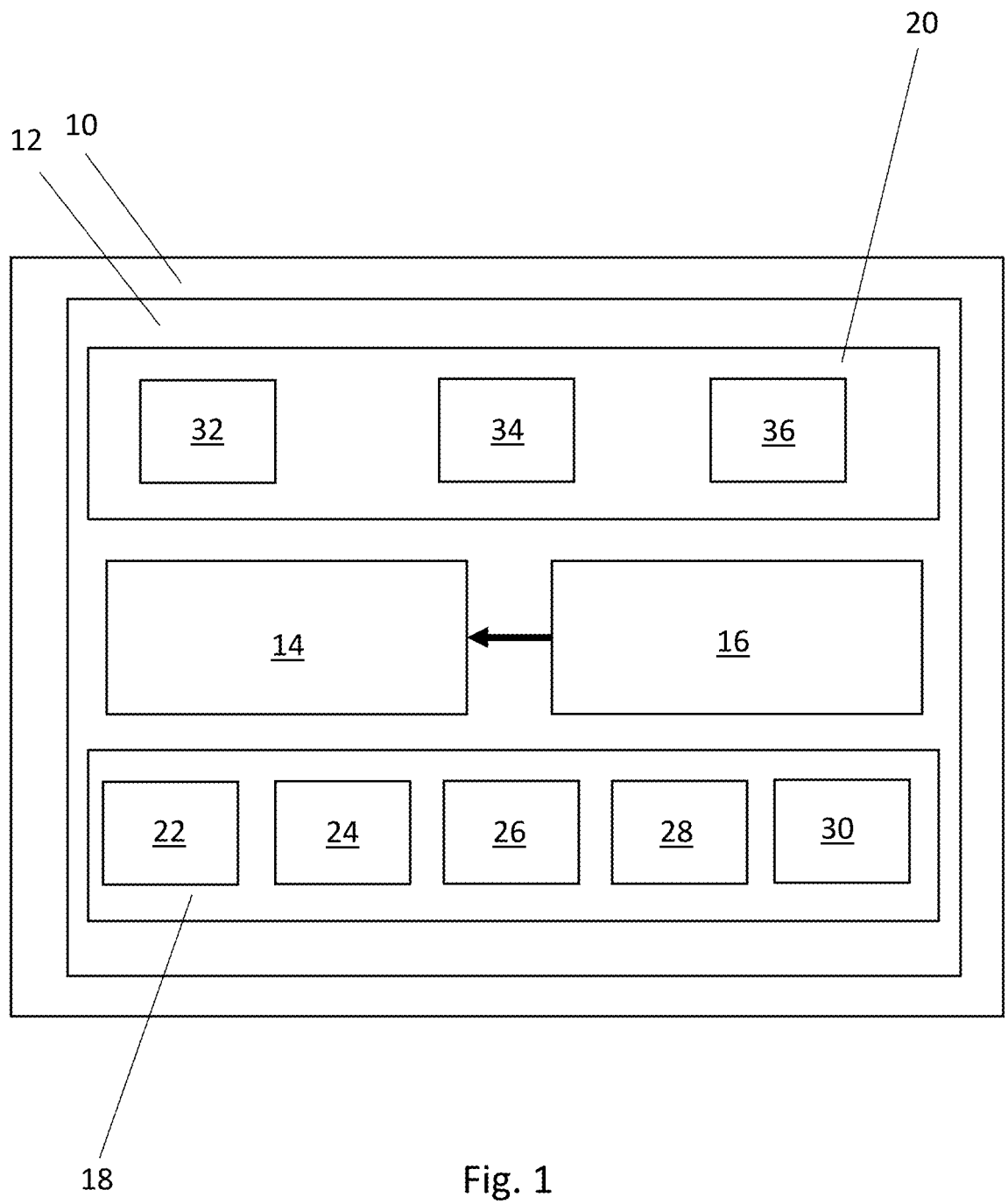
FIG. 1 shows a schematic of an aircraft comprising a variable pitch propeller system.

FIG. 1 shows an aircraft 10. The aircraft 10 comprises a variable pitch propeller system 12. The variable pitch propeller system 12 comprises a propeller 14, an engine 16, a pitch protection system 18 and a pitch control system 20.

The pitch protection system 18 comprises a virtual pitch sensor 22, a protection processor 24, an ambient sensing arrangement 26, a propeller sensing arrangement 28 and an engine sensing arrangement 30. Each of the ambient sensing arrangement 26, the propeller sensing arrangement 28 and the engine sensing arrangement 30 comprises a plurality of sensors configured to measure aircraft flight information as described below. It will be understood that several of the components may be embodied in a single processor (e.g. the virtual pitch sensor and the protection processor).

The pitch control system 20 (also referred to as a primary control system) comprises a controller 32, a propeller speed sensor 34 and a blade angle sensor 36.

Figure 2:
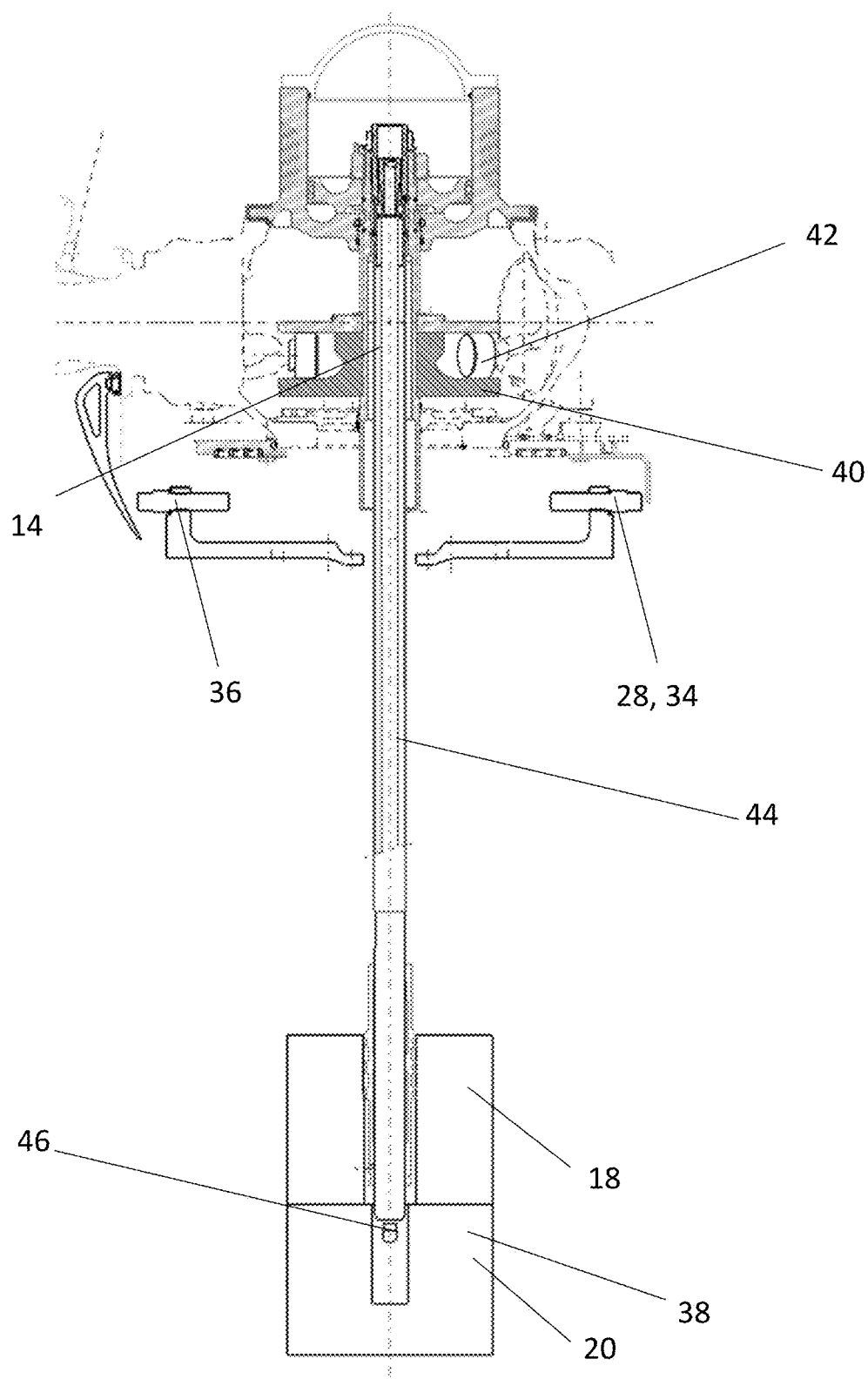
FIG. 2 shows a cross-sectional drawing of a propeller.

FIG. 2 shows the propeller 14 in more detail, highlighting the locations of the propeller sensing arrangement 28, the propeller speed sensor 34 and the blade angle sensor 36, which are located with the propeller 14, for example, contained in a propeller unit. The propeller sensing arrangement 28, propeller speed sensor 34 and the blade angle sensor 36 are located remotely from the pitch protection system 18 and the pitch control system 20.

In other examples, the blade angle sensor 36 may also be positioned remotely from the propeller 14, for example, with other components of the pitch control system 20.

In normal use, the engine 16 provides mechanical power to drive the propeller 14, which may be used for aircraft thrust or braking. The pitch of the propeller 14 is controlled by the pitch control system 20 in accordance with a pitch control process. In the pitch control process, the propeller speed sensor 34 measures propeller speed. The blade angle sensor 36 measures blade angle. The controller 32 receives the propeller speed and the blade angle and controls the propeller pitch. The controller 32 varies the blade angle (e.g. by controlling a blade angle actuator 38 through e.g. a mechanical, hydraulic or electro-mechanical system) to control the propeller pitch. In this example, the controller 32 uses the propeller speed and the blade angle to implement proportional-integral-derivative control to achieve a target propeller pitch. In other examples, the controller may implement non-linear control.

The propeller pitch or blade angle is a function of driving power and propeller rotating speed on one hand and of aircraft aero configuration and flying condition on the other hand. There is a unique propeller pitch for each such set of parameters.

In some cases, a failure of the propeller control system 20 may cause propeller pitch to be too low, resulting in low propeller pitch, which can cause aircraft controllability issues. As described below, in the event of low propeller pitch, the pitch protection system 18 performs a pitch protection process.

Figure 3:
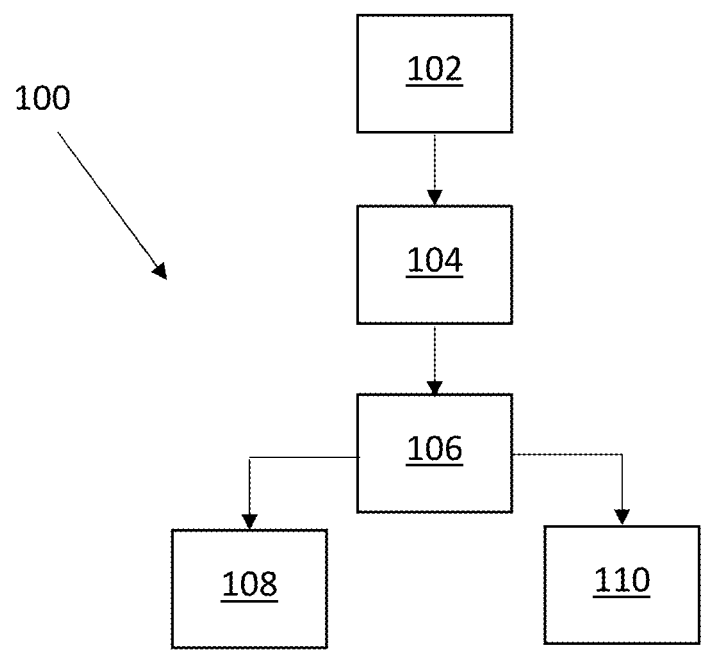
FIG. 3 shows a method of operating a variable pitch propeller system.

FIG. 3 shows a method 100 of operating the variable pitch propeller system 12. The method comprises an aircraft flight information receiving stage 102, a virtual pitch calculation stage 104, a virtual propeller pitch comparison stage 106, a pitch control stage 108 and a pitch protection stage 110.

In the aircraft flight information receiving stage 102, the virtual pitch sensor 22 receives aircraft flight information.

The aircraft flight information comprises air information. In the aircraft flight information receiving stage 102, the air information is measured by the ambient sensing arrangement 26.

The air information comprises aircraft speed information. The aircraft speed information comprises indicated airspeed. The aircraft speed information comprises Mach number. The aircraft speed information comprises true airspeed.

The air information comprises ambient information. The ambient information comprises aircraft altitude. The ambient information comprises ambient air density. The ambient information comprises ambient temperature.

The aircraft flight information comprises pitch, yaw and/or roll angles. The air information comprises angle of attack. The aircraft flight information comprises X, Y and Z accelerations. The aircraft flight information comprises aircraft weight. The aircraft flight information comprises aircraft control surface (e.g. flap and/or slat) status. The aircraft flight information comprises landing gear status.

In other examples, the air information may not be sensed directly. For example, satellite data may be used to determine aircraft speed data.

The aircraft flight information comprises propeller driving power information.

The propeller driving power information comprises engine parameters. The engine parameters comprise engine torque. The engine parameters comprise engine rotational speed. The engine parameters comprise engine power.

In the aircraft flight information receiving stage 102, the engine sensing arrangement 30 measures the engine parameters.

The propeller driving power information comprises propeller parameters. The propeller parameters comprise propeller rotational speed. The propeller parameters comprise propeller thrust.

In the aircraft flight information receiving stage 102, the propeller sensing arrangement 28 measures the propeller parameters.

The aircraft flight information does not comprise measured propeller pitch. The aircraft flight information does not comprise measured blade angle. The pitch protection system does not comprise a blade angle sensor.

The aircraft flight information receiving stage 102 may comprise an aircraft flight information verification process. The aircraft flight information verification process may comprise determining that a sensor is operational, within range and/or connected. The aircraft flight information verification process may comprise cross-checking with data from another sensor. In the event that sensor is not operational, within range and/or connected, or the aircraft flight information verification process fails for another reason, some aircraft flight information may not be used in the virtual pitch calculation. In this case, an alert may be generated by the pitch control and/or protection system and sent to the pilot and/or as a maintenance information available on aircraft and/or sent wirelessly to a maintenance platform.

In the virtual pitch calculation stage 104, the virtual sensor 22 performs a virtual pitch calculation to determine a virtual propeller pitch or virtual blade angle from the aircraft flight information.

The virtual pitch calculation comprises an air information computation performed on the air information. The virtual pitch calculation comprises a propeller power computation performed on the propeller driving power information to determine the virtual propeller pitch or virtual blade angle. The virtual pitch calculation may be implemented through a neural network or other machine learning technique, a map and/or a lookup table.

One illustrative example of virtual blade angle calculation is presented here below:
Exemplary Input Parameters:
Aircraft altitude (ALT)
Aircraft speed (AS)
Ambient temperature (Tamb)
Propeller rotational speed (NP)
Propeller driving torque (TQ)

True air speed (TAS), air density ($\rho$) and Mach number (Mn) may be determined from ambient temperature (Tamb), aircraft speed (AS) and altitude (ALT), or from other parameters physically equivalent thereto, through calculation, look-up tables, interpolation, machine learning, neural network or any other suitable method.

Advance ratio/may be determined from the true airspeed (TAS), the propeller speed (NP) and the propeller diameter (Ø), or from other parameters physically equivalent thereto, through calculation, look-up tables, interpolation, machine learning, neural network or any other suitable method.

Propeller shaft horsepower (SHP) may be determined from the propeller rotational speed (NP) and the propeller driving torque (TQ), or from other parameters physically equivalent thereto, through calculation, look-up tables, interpolation, machine learning, neural network or any other suitable method.

Power coefficient (Cp) may be determined from the propeller shaft horsepower (SHP), the propeller rotational speed (NP), the air density ($\rho$) and the propeller diameter (Ø), or from other parameters physically equivalent thereto, through calculation, look-up tables, interpolation, machine learning, neural network or any other suitable method.

Virtual blade angle may then be determined from the Mach number (Mn), advance ratio J, power coefficient (Cp) or from other parameters physically equivalent thereto, and aerodynamic model of the propeller (the "aerodeck"), through calculation, look-up tables, interpolation, machine learning, neural network or any other suitable method. The principle of the virtual blade angle determination relies here on "inverse aerodeck", that is to say using an inverse method to what is performed conventionally to determine aircraft performances (for instance Mach number (Mn), advance ratio J, power coefficient (Cp)) based on aerodynamic characteristics of the propeller (geometry).

Concerning the above virtual blade angle determination example, it should be understood that fewer or more input parameters may be used, fewer or more intermediate parameters may be determined in order to determine a more or less accurate virtual blade angle. For instance aircraft high lift configuration (flaps, slats, THSA) and attitude (Nz, yaw, GW, . . . ) may be taken into account in addition to the above parameters for the determination of a more refined virtual blade angle.

This virtual blade angle determination example is only illustrative, and in no way limiting. Any suitable alternative to perform a determination of virtual blade angle based on aircraft flight information is also in the scope of the present invention.

The virtual pitch calculation may implement equations based on the lifting line solution. This solution deals with vortex theory, in which vorticity is shed from the blade sections as the propeller moves through the air. Several such solutions have been developed. The following references can be used to compute the equations: Goldstein S. "On the Vortex Theory of Screw Propellers." (1929); Locke C. N. H, Yeatman D. "Tables for Use in an Improved Method of Airscrew Strip Theory Calculation" (1934); McCormick B. W. "Aerodynamics of V/STOL Flight" (1967); Ladden, Gilmore "Advanced V/STOL Propeller Technology" Vol. II (1971); and Baskin V. E., Vildgrube L. S., Vozhdayev Y. S., Maykapar C. I. "Theory of the lifting airscrew" (1973). These references are given as an example.

In other examples, the aircraft flight information does not comprise all of the information described above. Some of the aircraft flight information may be determined from other aircraft flight information. For example, engine power may be determined from engine torque and engine rotational speed. Some of the aircraft flight information mentioned above may be omitted entirely. The virtual pitch calculation may not use all of the aircraft flight information mentioned above to determine the virtual propeller pitch or virtual blade angle. Any combination of the listed aircraft flight information may be used. The list presented herein is non-exhaustive.

By performing the virtual pitch calculation, the number of sensors may be reduced and the variable pitch propeller system may be simplified (e.g. due to a blade angle sensor not being included in the pitch protection system).

In the virtual propeller pitch comparison stage 106, the protection processor 24 receives the virtual propeller pitch from the virtual pitch sensor 22. The protection processor 24 compares the virtual propeller pitch to a propeller pitch threshold.

In the event that the virtual propeller pitch is greater than or equal to the propeller pitch threshold, the protection processor 24 sends a control signal to the controller 32, which causes the pitch control stage 108 to be implemented.

In the pitch control stage 108, the pitch of the propeller 14 is controlled by the pitch control system 20 according to the pitch control process as described above. The method 100 is then performed again. The method 100 may be performed periodically.

In the event that the virtual propeller pitch is less than the propeller pitch threshold, a low virtual propeller pitch or virtual blade angle is determined. The protection processor 24 implements a pitch protection process in the pitch protection stage 110.

Low virtual propeller pitch or virtual blade angle may be determined when there is a fine pitch (i.e. with movement towards reverse). In contrast, a higher propeller pitch or blade angle may be defined by a coarse pitch or angle (i.e. with movement towards feather).

In the pitch protection process, the protection processor 24 controls the propeller 14 to increase the propeller pitch. In particular, the protection processor 24 bypasses the pitch control system 20, with the pitch control system 20 no longer used to control the propeller pitch. In order to increase the propeller pitch, the protection processor 24 may reduce a propeller speed and/or increase a blade angle. To increase the blade angle, the protection processor 24 may de-energize an actuator of the pitch control system 20, which may open a valve, permitting control fluid to reach the propeller 14 to increase the blade angle. In some examples alternative features for increasing the blade angle may be used.

After the pitch protection process, if the failure resulting in the low pitch event is rectified or removed, the pitch of the propeller 14 may be controlled by the pitch control system 20 according to the pitch control process again.

Figure 4:
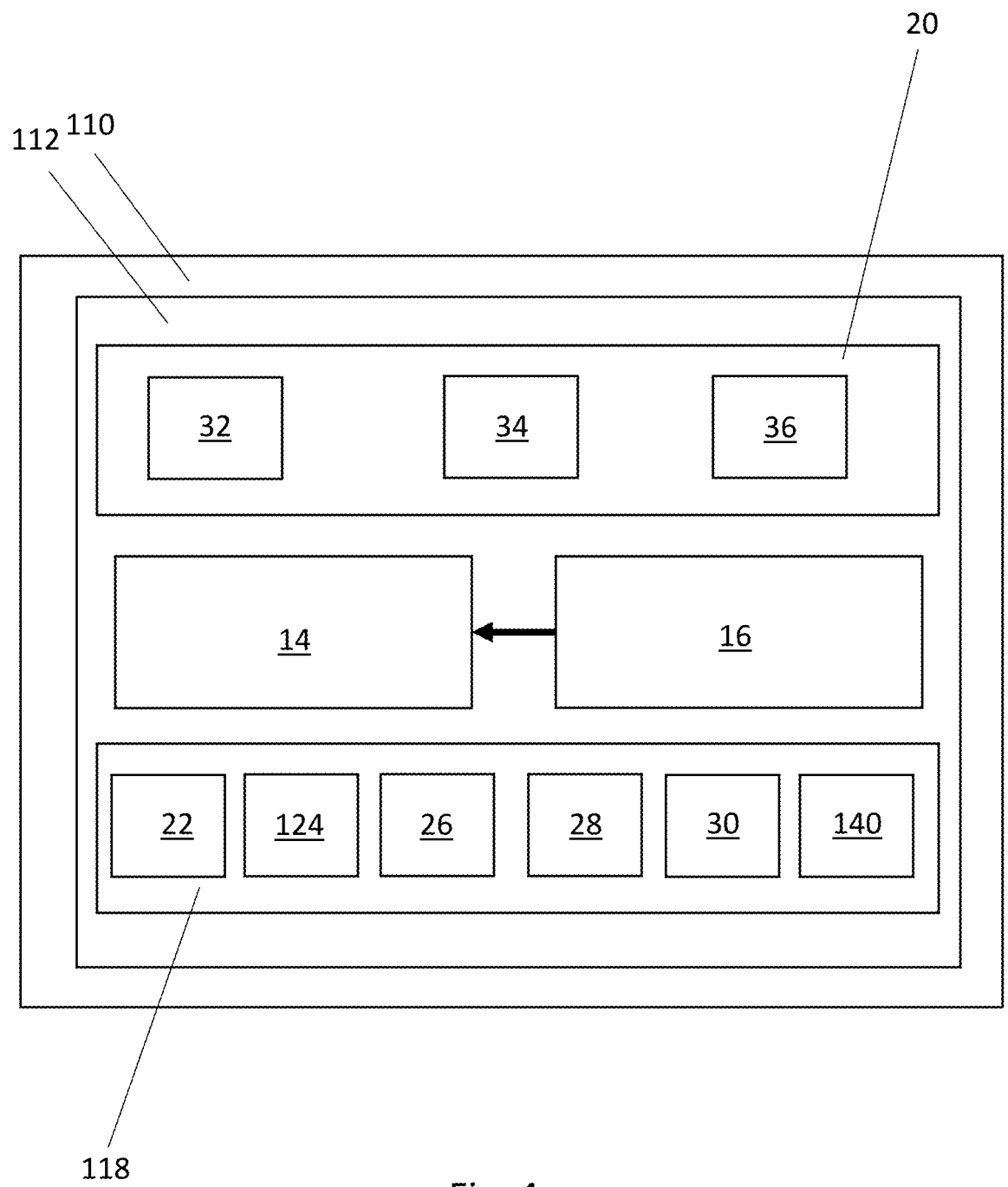
FIG. 4 shows a schematic of a second aircraft comprising a second variable pitch propeller system.

FIG. 4 shows a second aircraft 110. The second aircraft 110 comprises many of the features of the aircraft 10. Repeated description of common features is omitted and only the differences are described here.

The second aircraft 110 comprises a second variable pitch propeller system 112, which, like the variable pitch propeller system 12, comprises a propeller 14, an engine 16 and a pitch control system 20.

In contrast to the variable pitch propeller system 12, the second variable pitch propeller system 112 comprises a health monitoring system 118 rather than the protection system 18. The health monitoring system 118 comprises a virtual pitch sensor 22, an ambient sensing arrangement 26, a propeller sensing arrangement 28 and an engine sensing arrangement 30, each operating in the same manner as those components of the pitch protection system 18, with the virtual pitch sensor 22 performing the virtual pitch calculation to determine virtual propeller pitch or virtual blade angle. The health monitoring system 118 comprises a physical sensor 140 configured to measure propeller pitch or blade angle.

The health monitoring system 118 further comprises a health monitoring processor 124. The health monitoring processor 124 is configured to use the virtual propeller pitch or virtual blade angle to perform a health monitoring process to determine a health of the aircraft.

Figure 5:
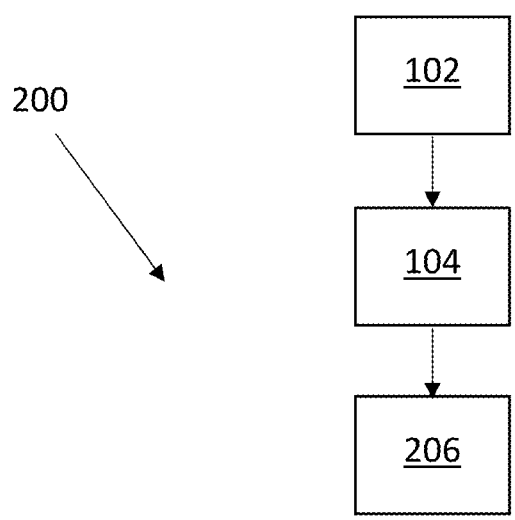
FIG. 5 shows a method of operating the second variable pitch propeller system.

FIG. 5 shows a method 200 of operating the second variable pitch propeller system 112. The method comprises the aircraft flight information receiving stage 102, the virtual pitch calculation stage 104 and a health monitoring stage 206. The aircraft flight information receiving stage 102 and the virtual pitch calculation stage 104 are performed in the same manner as in the method 100, and repeated description of those stages is omitted.

In the health monitoring stage 206, the health monitoring processor 124 performs the health monitoring process. In the health monitoring process, the health monitoring processor 124 compares the virtual propeller pitch to a measured propeller pitch.

In the present example, the measured propeller pitch is determined using the physical sensor, for example, from pulse pick up measured signals from targets located on the blade and on the propeller rear bulkhead. In other examples, the blade pitch may also be measured with transfer tube aft side contact sensors in system configurations where the transfer tube translation follows propeller pitch actuator displacement. In this case, the actuator is linked with the blade trunnion pin through dedicated kinematic to transform blade pitch at blade level into actuator and so transfer tube axial displacement.

From the comparison between the virtual propeller pitch and the measured propeller pitch, the health monitoring processor determines a wear condition of a component of the aircraft, which in the present example is an aircraft system. In some examples, a poor health condition may be determined where a discrepancy (e.g. a difference) between a virtual value (e.g. virtual propeller pitch) and a measured value (e.g. measured propeller pitch) exceeds a threshold.

The aircraft system may be a mechanical system, an electrical system and/or a gearbox of the propeller 14. In some examples, the health monitoring process may comprise determining a failure of at least one component of the aircraft, wherein the at least one component is distinct from the blades.

The at least one component may be a propeller gearbox and/or a propeller pitch change actuator. Indeed a failure of a propeller gearbox and/or a propeller pitch change actuator will lead to a discrepancy between a virtual propeller pitch and a measured propeller pitch, and as a consequence will be detected by the present health monitoring method. The health monitoring method will not necessarily enable to isolate which component is failed, however groups of components may be isolated depending on virtual blade angle model parameter values. An advantage of the method is that not only a failure at propeller blade level can be detected, but also failures of components physically interacting with the propeller: propeller drive (e.g. gearbox), propeller pitch change actuation system, as non-exhaustive examples.

The propeller gearbox is used to adapt engine rotation speed to propeller needed optimized speed. Propellers typically rotate at a much reduced RPM in comparison to an engine because of their much larger diameter and the need to maintain blade tip speed subsonic. A propeller gearbox is a mechanical device which uses gears to reduce the output speed (propeller shaft) from the higher input speed (input shaft). The gearbox may comprise two stages. The first stage of the gearbox may comprise a first stage gear and a first stage pinion. The second stage of the gearbox may comprise a planetary gear. A planetary gear is a gear system combining epicycle gear trains with a planet engaging both a sun gear and a ring gear. The second stage of the gearbox may comprise a carrier. The gearbox may comprise an idler gear shaft. The gear may be helical gear or bull gear or bevel gear. Gear shafts are often guided in the gearbox housing with roller or ball bearings. Torquemeters are typically installed at the input of the gearbox, meaning that they measure the input torque to the gearbox, not the actual output torque driving the propeller.

A gearbox failure may be a first stage gear failure, a first stage pinion failure, a planetary failure, an input shaft failure or a propeller shaft failure and/or ball or roller bearing failures. A gearbox failure will impact the transfer efficiency between the inlet and the outlet of the gearbox meaning that the ratio between output torque of the gearbox and its input torque will decrease. Less propeller driving torque available for a given input torque. This gearbox efficiency degradation will be detected by the health monitoring (via virtual pitch comparison to actual pitch). For example, an efficiency degradation of 20% is equivalent to 1 degree on the blade angle pitch.

In a propeller system architecture where the blade pitch is measured with transfer tube aft side contact sensors with transfer tube translation following the propeller pitch actuator displacement, a propeller pitch change actuator failure may be, for example:
  a yoke deformation/a plate 40 deformation (actuator—blade mechanical link)
  a transfer tube 44 shift (control module—actuator hydraulic link)
  a feedback lever 46 deformation,
  a feedback measurement failure (out of range and/or erroneous valid signals).

All these failures result in a shift of the transfer tube 44 axial displacement measurement. These failures will be detected by the health monitoring process.

In this case, the actuator is linked with the blade trunnion pin 42 through dedicated kinematic to transform blade pitch at blade level into actuator and so transfer tube axial displacement.

If a failure is determined, an alert may be generated by the health monitoring system and sent to the pilot and/or as a maintenance information available on aircraft and/or sent wirelessly to a maintenance platform.

The health monitoring stage 206 may be performed during flight or on the ground post-flight. The virtual pitch calculation stage 104 may also be performed during flight or on the ground post-flight. In some examples the health monitoring stage 206 and/or the virtual pitch calculation stage 104 may be performed partially during flight and partially on the ground post-flight.

In some examples the variable pitch propeller system comprises both the protection system 108 and the health monitoring system 118. In such examples, common virtual pitch sensor 22, ambient sensing arrangement 26, propeller sensing arrangement 28 and engine sensing arrangement 30 components may be shared between the protection 108 and the health monitoring system 118, for example, with the components being common to the systems.

While method steps and/or features have been described with respect to a specific processor, control or sensor, the steps or features may be performed by the same component or across multiple components. For example, the virtual pitch sensor 22 and the protection processor 24 may be implemented in the same processor or across several different processors. Additionally, some processors may be located remotely from the aircraft, and may communicate with components of the aircraft.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of performing health monitoring for an aircraft having a variable pitch propeller system, the method comprising:
  receiving aircraft flight information;
  performing a virtual pitch calculation to determine a virtual propeller pitch or virtual blade angle from the aircraft flight information;
  receiving a measured propeller pitch or blade angle from at least one physical sensor associated with the propeller; and
  using the virtual propeller pitch or virtual blade angle and the measured propeller pitch or blade angle to perform a health monitoring process to determine a health condition of at least one component of the aircraft, wherein the at least one component is distinct from the blades.

2. The method according to claim 1, wherein the determining the health condition comprises propeller gearbox failure detection and/or propeller pitch change actuator failure detection.

3. The method according to claim 1, wherein the aircraft flight information comprises air information, the virtual pitch calculation comprising an air information computation performed on the air information to determine the virtual propeller pitch or virtual blade angle.

4. The method according to claim 3, wherein the method comprises sensing the air information.

5. The method according to claim 3, wherein the air information comprises aircraft speed information.

6. The method according to claim 1, wherein the aircraft flight information comprises propeller driving power information, the virtual pitch calculation comprising a propeller power computation performed on the propeller driving power information to determine the virtual propeller pitch or virtual blade angle.

7. The method according to claim 6, method further comprising:
sensing the propeller driving power information from an engine of the aircraft, the engine configured to drive the propeller.

8. The method according to claim 1, wherein the health monitoring process may comprise comparing the virtual propeller pitch or virtual blade angle to a measured propeller pitch.

9. The method according to claim 1, wherein the health monitoring process comprises determining a failure or a wear condition of the component of the aircraft.

10. The method according to claim 1, wherein the virtual pitch calculation comprises performing an aircraft flight information verification process to verify that the aircraft flight information is valid.

11. The method according to claim 1, wherein the health monitoring process is at least partially performed during flight.

12. The method according to claim 1, wherein the health monitoring process is at least partially performed when the aircraft is not flying.

13. A health monitoring system for a variable pitch propeller system of an aircraft, the health monitoring system comprising:
a virtual pitch sensor configured to receive aircraft flight information and perform a virtual pitch calculation to determine a virtual propeller pitch or virtual blade angle from the aircraft flight information;
at least one physical sensor configured to measure propeller pitch or blade angle; and
a health monitoring processor configured to use the virtual propeller pitch or virtual blade angle and the measured propeller pitch or blade angle to perform a health monitoring process to determine a health condition of at least one component of the aircraft, wherein the at least one component is distinct from the blades.

14. A variable pitch propeller system comprising:
a health monitoring system according to claim 13; and
the propeller.

15. An aircraft comprising:
the variable pitch propeller system according to claim 13.

16. The aircraft of claim 15, further comprising:
the propeller.

* * * * *